PICKERING & ST. JOHN.
Ore Mill.

No. 71,055.  Patented Nov. 19, 1867.

Witnesses  Inventor

United States Patent Office.

LORING PICKERING AND CHAUNCEY ST. JOHN, OF NEW YORK, N. Y.

Letters Patent No. 71,055, dated November 19, 1867.

IMPROVEMENT IN QUARTZ-MILLS.

The Schedule referred to in these Letters Patent and making part of the same.

TO ALL WHOM IT MAY CONCERN:

Be it known that we, LORING PICKERING and CHAUNCEY ST. JOHN, both of the city and State of New York, have invented a new and improved Apparatus for Pulverizing Minerals and other Substances; and we do hereby declare that the following is a full, clear, and exact description thereof, which will enable those skilled in the art to make and use the same, reference being had to the accompanying drawing, forming part of this specification, in which drawing—

Figure 3 is a detached elevation of one of the agitators.

Similar letters indicate corresponding parts.

Figure 1:
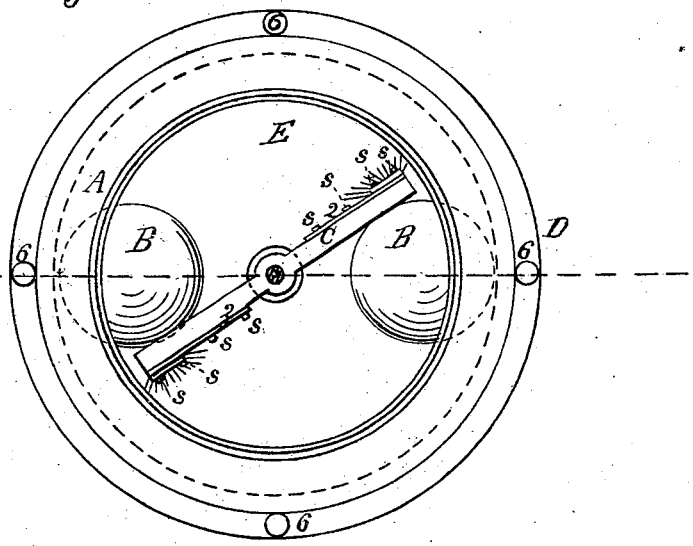
Figure 1 represents a sectional plan of this invention.
Figure 2:
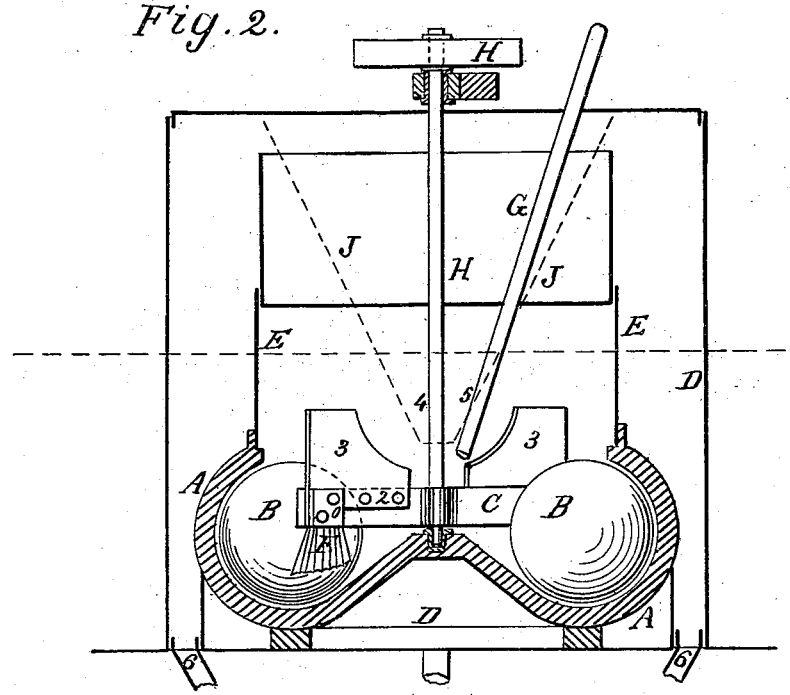
Figure 2 is a vertical central section of the same.
Figure 2:
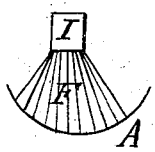

This invention relates to an apparatus which is composed of an annular pan or trough, capable of receiving one or more spherical mullers, which are chased at a very rapid rate through said trough, in such a manner that by the action of said mullers, mineral ores or other materials are pulverized with comparatively little trouble or loss of time, the annular trough being made in such a shape that the spherical mullers are prevented from rising in the same or from flying off at a tangent by the centrifugal force. The motion of the spherical mullers is produced by radial arms extending from a vertical shaft, to which the required motion is imparted by a belt and pulley, or other equivalent means. From the upper edges of the propelling arms rise two fans, which serve to drive off the dust, and from the bottom edges of said arms descend agitators, which serve to stir up the material contained in the trough, and to keep it in the proper condition to be acted on by the mullers. From the top edge of the pan or trough rises a cylinder, which may be provided with an extension piece, and into which descends an inverted cone, the whole being covered by a jacket in such a manner that the dust rising from the pan or trough is compelled to collect at the bottom of the jacket, whence it will discharge through pipes, or, if desired, it can be removed, and the operation of pulverizing can be effected without incurring any loss or waste.

A represents a pan, which is made of cast iron or any other suitable material, and which is provided with an annular trough to receive the spherical mullers B. The bottom of said pan rises towards its centre, so that the material fed through the feed pipe G or through the cone J, will roll down under the mullers. From the centre of the pan rises a shaft, H, to which a revolving motion can be imparted by suitable means, and from which radiate two arms C, which bear against the spherical mullers, and serve to propel the same at a rapid speed through the trough of the pan A, said trough being so shaped that the mullers are prevented from being thrown off by the centrifugal force. From the top edges of the propelling-arms C rise two fans, 3, which serve to chase off the dust rising from the trough during the operation of pulverizing, and from the bottom edges of said arms extend agitators F, which bear against the bottom of the trough, and serve to keep the material to be pulverized in proper order to be acted on by the mullers. From the top edge of the pan rises a cylinder, E, which may be provided with an extension piece, so that it can be lengthened or shortened, and through the top of said cylinder is introduced an inverted cone, J, the whole apparatus being covered up by a jacket, D, which is made of sheet metal or any other suitable material, closed on the top, and provided with one or more outlets, 6, at the bottom. By the jacket D the dust which rises from the pan A during the operation of pulverizing is prevented from escaping into the open air, and it is made to collect at the bottom of said jacket, whence it discharges through the pipes, or it can be readily removed. By the cone J the dust rising from the pan is conducted towards the circumference of the cylinder, and by lengthening or shortening said cylinder, the space through which the dust escapes over the top edge of said cylinder can be increased or diminished according to the nature of the material to be pulverized. Through the interior of the cone, or through the pipe G, a sufficient quantity of air enters for the fans to act upon, and by the current of air thus created the discharge of the dust from the trough is effected.

The operation of pulverizing can thus be accomplished without any waste, and furthermore, by the rapidly revolving spherical mullers, very hard substances are readily crushed and pulverized with comparatively little power or loss of time.

We are aware of the patent granted to J. H. Sweet, February 10, 1852, for a quartz mill, in which the arms catch up, carry, and throw the mullers while revolving in one direction as the cylinder or pan revolves in the opposite direction. Our arms merely roll or push the balls in the same plane in the annular groove, and during their motions the agitators and fans follow them, thus obviating the necessity of a revolving cylinder.

Greater power is required to raise the mullers or balls than to roll them. The striking and falling of the balls will materially injure the cylinder, especially so since it must be perforated to admit the exit of the ground particles. We, therefore, claim superiority of invention. Sweet's invention has no jacket and cone.

We do not claim any of the parts, the subject-matter of the aforesaid patent; but

What we claim as new, and desire to secure by Letters Patent, is—

1. In a quartz-mill, the pan A, having an annular trough, the mullers B propelled by arms C, having fans 3 and agitators F, constructed and operating substantially as described.

2. The jacket D and cone J, when arranged with the cylinder E, and used in combination with the parts of the above-described quartz-mill, substantially in the manner and for the purpose specified.

LORING PICKERING,
CHAUNCEY ST. JOHN.

Witnesses:
WASHINGTON HILLS, Jr.,
T. A. WHITTAKERS.